(12) United States Patent
Yang

(10) Patent No.: US 6,382,547 B1
(45) Date of Patent: May 7, 2002

(54) SLIDING PROOF DEVICE IN COMBINATION WITH A MEASURING TAPE

(75) Inventor: Tse-Chung Yang, Maio Li Hsien (TW)

(73) Assignee: Taiwan Woei Shing Co., LTD, Maio Li Hsien (TW)

( * ) Notice: Subject to any disclaimer, the term of this patent is extended or adjusted under 35 U.S.C. 154(b) by 0 days.

(21) Appl. No.: 09/823,452

(22) Filed: Mar. 30, 2001

(51) Int. Cl.⁷ .............................................. B65H 75/48
(52) U.S. Cl. ........................................ 242/379; 33/769
(58) Field of Search ............................... 242/379, 405; 33/761, 769

(56) References Cited

U.S. PATENT DOCUMENTS 4,527,334 A * 7/1985 Jones et al. ................. 242/379

* cited by examiner

Primary Examiner—John Q. Nguyen
(74) Attorney, Agent, or Firm—Pro-Techtor International Services

(57) ABSTRACT

A measuring tape has a housing with a tape rolled in the housing and a sliding proof device securely mounted on top of the housing. The sliding proof device has stubs and bosses formed on the inner face thereof, such that the stubs and bosses are able to be inserted into the corresponding apertures and holes in the housing to secure the engagement between the sliding proof device and the housing.

2 Claims, 2 Drawing Sheets

SLIDING PROOF DEVICE IN COMBINATION WITH A MEASURING TAPE

BACKGROUND OF THE INVENTION

1. Field of the Invention

The present invention relates to a sliding proof device, and more particularly to a sliding proof device in combination with a measuring tape. The sliding proof device includes multiple stubs respectively inserted into halves of the measuring tape housing and bosses inserted into the holes in the housing so as to secure the sliding proof to the housing.

2. Prior Art Description

A conventional measuring tape includes a housing and a tape received in the housing. The free end of the tape has a hook attached to the free end of the tape by means of securing device such as rivet. When the measuring tape is used to measure an object, the hook is hooked onto the corner of the object so as to extend the tape to allow the user to read the measurement from the marks on the tape. However, this kind of measurement still has drawbacks, such as:

When the tape is drawn our from the housing, a sliding proof device normally is adhered at the outlet of the housing, which is provided to prevent the tape from sliding backward into the housing. After a period of time of repeatedly using the sliding proof device and due to the oxidation effect to the surface of the sliding proof device, the sliding proof device gradually falls off from the surface of the housing. Although some manufacturer uses bosses formed on the inner face of the tape to increase the engagement with the housing, because the materials for the housing and the sliding proof device are not the same, the sliding proof device still falls off from the surface of the housing.

The present invention provides an improved measuring tape to overcome the above mentioned shortcomings.

SUMMARY OF THE INVENTION

The primary objective of the invention is to provide an improved sliding proof device for a measuring tape, which has stubs and bosses to allow the sliding proof device to be securely engage with the housing of the measuring tape.

To accomplish the aforementioned purpose, the sliding proof device has two rows of stubs oppositely formed on the inner face of the sliding proof device and multiple centrally formed bosses to be inserted into the holes defined in the housing of the measuring tape, such that the sliding proof device is able to be securely engaged with the housing.

Other objects, advantages and novel features of the invention will become more apparent from the following detailed description when taken in conjunction with the accompanying drawings.

DETAILED DESCRIPTION TO THE PREFERRED EMBODIMENT

Figure 1:
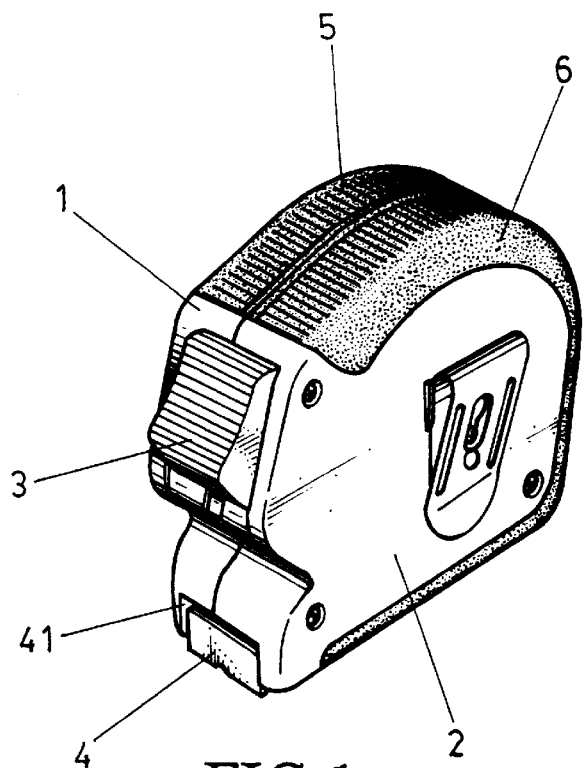
FIG. 1 is a perspective view of the sliding proof device together with a measuring tape constructed in accordance with the present invention.
Figure 2:
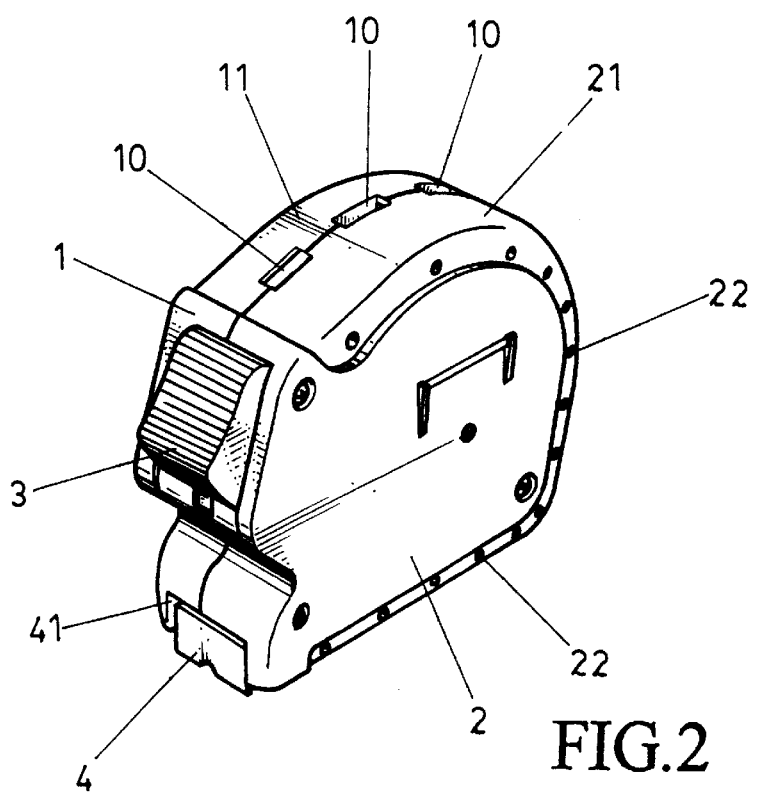
FIG. 2 is a perspective view of the measuring tape with the sliding proof device removed.
Figure 3:
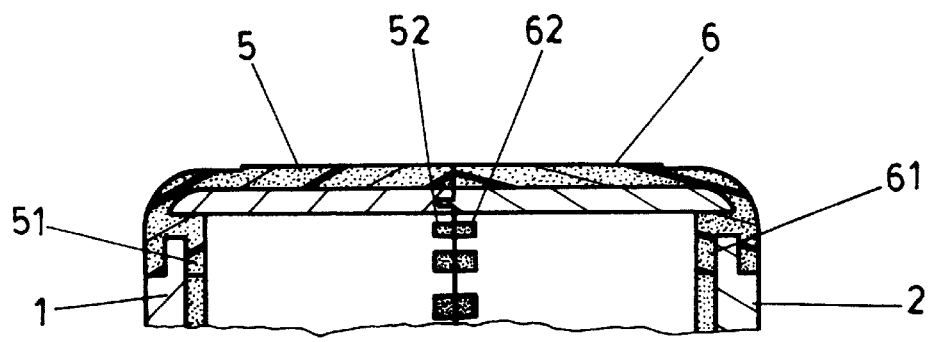
FIG. 3 is a cross sectional view of line 3—3 of FIG. 1.
Figure 4:
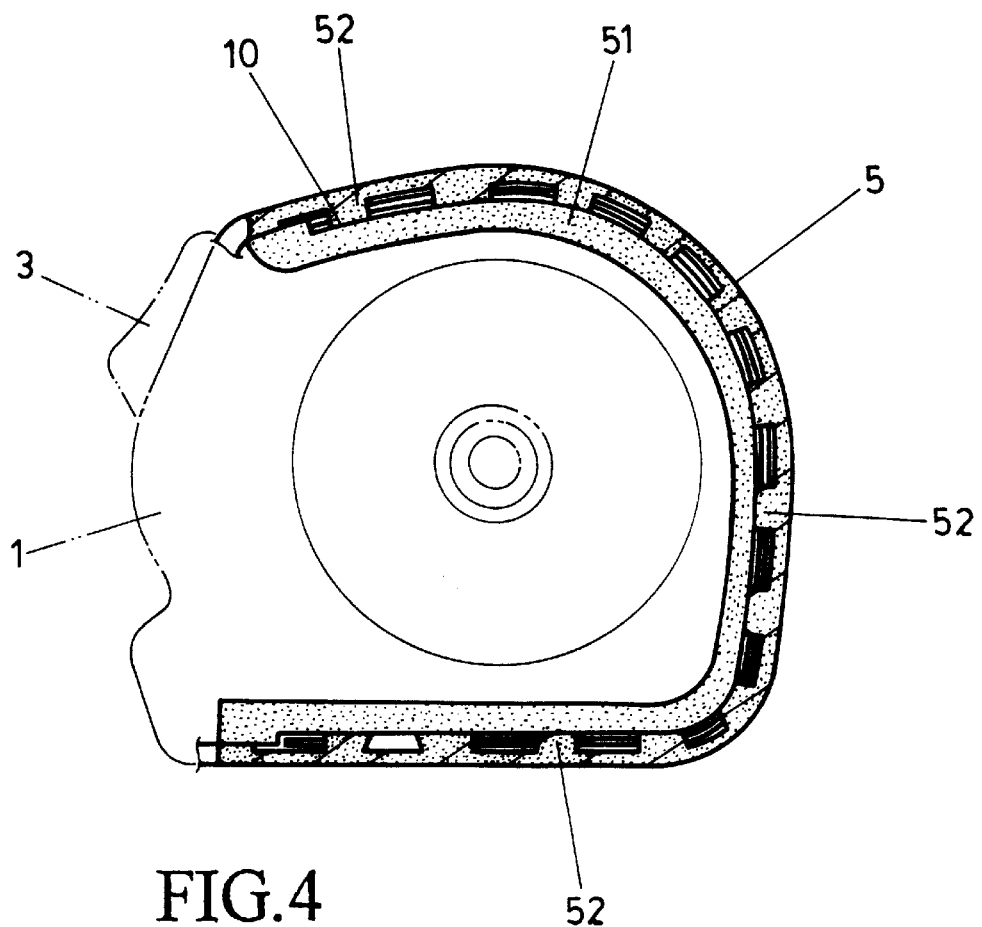
FIG. 4 is a schematic view showing the engagement between the sliding proof device and the housing of the measuring tape.

With reference to FIGS. 1, 2, 3 and 4, a measuring tape has a housing composed of a first half (1) and a second half (2), a push button (3) provided at the outlet (41) of the housing (1), a tape (4) extendably received in the housing (1) and controlled by the push button (3) and a sliding proof device securely mounted on top of the housing (1) and having a first piece (5) and a second piece (6).

Because the measuring tape structure is well known in the art, detailed description to the function and operation of the measuring tape is thus omitted.

The sliding proof device is made of rubber so as to provide the desired effect to the extended tape (4) to prevent the tape (4) from sliding backward into the housing (1). The first and second pieces (5,6) of the sliding proof device is respectively mounted on the first and second halves (1,2) of the housing and each has a row of stubs (51,61) formed on an inner face and along an outer peripheral edge of the first and second pieces (5,6) respectively.

Furthermore, the first and second pieces (5,6) of the sliding proof device each has a row of bosses (52,62) oppositely formed with respect to the stubs (51,61). That is, each of the first and second pieces (5,6) has a row of stubs (51,61) and a row of bosses (52,62) formed on the inner face and along the peripheral edge of the first and second pieces (5,6) respectively.

Corresponding to the stubs (51,61) and bosses (52,62) of the first and second pieces (5,6) of the sliding proof device, the first half (1) and second half (2) of the housing (1) each has multiple apertures (11,22) defined in a respective peripheral edge thereof When in assembly, the stubs (51,61) are respectively inserted into a corresponding one of the apertures (11,22), which allows the sliding proof device to securely enclose the upper portion of the housing (1). Further, the bosses (52,62) are then respectively inserted into a corresponding one of centrally defined holes (10) in the housing (1).

With such an arrangement, the rubber-made sliding proof device is able to securely mounted on the upper portion of the housing (1) without worrying that the sliding proof device may fall off from the housing after a period time using the sliding proof device.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A measuring tape comprising a housing, a tape extendably rolled in the housing, means for controlling the extended tape and a sliding proof device mounted on top of the housing, wherein the improvements comprise:

the sliding proof device having two rows of stubs oppositely formed on an inner face and along a peripheral edge thereof so as to be inserted into apertures in a periphery of the housing.

2. The measuring tape as claimed in claim 1 further comprising bosses centrally formed on the inner face of the sliding proof device and between the stubs to be inserted into centrally defined holes in the housing.

* * * * *